(12) United States Patent
Sato

(10) Patent No.: US 11,210,531 B2
(45) Date of Patent: Dec. 28, 2021

(54) INFORMATION PROCESSING APPARATUS FOR PRESENTING LOCATION TO BE OBSERVED, AND METHOD OF THE SAME

(71) Applicant: CANON KABUSHIKI KAISHA, Tokyo (JP)

(72) Inventor: Shunsuke Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 16/535,973

(22) Filed: Aug. 8, 2019

(65) Prior Publication Data
US 2020/0057893 A1 Feb. 20, 2020

(30) Foreign Application Priority Data
Aug. 20, 2018 (JP) .............................. JP2018-154108

(51) Int. Cl.
*G06K 9/00* (2006.01)
(52) U.S. Cl.
CPC ..... *G06K 9/00778* (2013.01); *G06K 9/00369* (2013.01); *G06K 9/00671* (2013.01)
(58) Field of Classification Search
CPC ........... G06K 9/00369; G06K 9/00671; G06K 9/00778
See application file for complete search history.

(56) References Cited

U.S. PATENT DOCUMENTS

| | | | | |
|---|---|---|---|---|
| 8,295,597 B1 * | 10/2012 | Sharma | .................. | G06T 7/20 382/173 |
| 8,665,333 B1 * | 3/2014 | Sharma | ............ | G08B 13/19643 348/159 |
| 9,794,508 B2 * | 10/2017 | Gouda | .................. | H04N 7/183 |
| 9,870,684 B2 * | 1/2018 | Wang | ............... | G08B 13/19691 |
| 9,984,300 B2 * | 5/2018 | Miyano | .................. | G06T 7/251 |
| 2005/0163212 A1 * | 7/2005 | Henson | ............ | G08B 13/19613 375/240.01 |
| 2006/0222206 A1 * | 10/2006 | Garoutte | .................. | H04N 7/18 382/103 |
| 2012/0105634 A1 * | 5/2012 | Meidan | .............. | G08B 13/1965 348/143 |
| 2012/0308090 A1 * | 12/2012 | Sukegawa | .......... | G06K 9/00288 382/118 |

(Continued)

FOREIGN PATENT DOCUMENTS

| | | |
|---|---|---|
| JP | 2014-182628 A | 9/2014 |
| JP | 2015-056697 A | 3/2015 |

*Primary Examiner* — Ian L Lemieux
(74) *Attorney, Agent, or Firm* — Canon U.S.A., Inc. IP Division

(57) ABSTRACT

An information processing apparatus includes a first setting unit configured to set a plurality of observation necessity degrees of positions in a real space and times, a first display unit configured to display the plurality of observation necessity degrees mapped based on a position in the real space and a time, a second display unit configured to display a plurality of targets detected from a captured image, based on observation necessity degrees each corresponding to a different one of the plurality of targets, and a receiving unit configured to receive an input of information corresponding to at least one target of the plurality of targets. The first setting unit resets at least one observation necessity degree of the plurality of observation necessity degrees based on the input information.

20 Claims, 13 Drawing Sheets

(56) References Cited

U.S. PATENT DOCUMENTS

| | | | |
|---|---|---|---|
| 2013/0155229 A1* | 6/2013 | Thornton | H04N 7/18 348/143 |
| 2014/0233863 A1* | 8/2014 | Barrington | G06F 16/29 382/305 |
| 2014/0328512 A1* | 11/2014 | Gurwicz | G06K 9/6263 382/103 |
| 2015/0248587 A1* | 9/2015 | Oami | H04N 7/181 382/103 |
| 2015/0262019 A1* | 9/2015 | Miyano | H04N 7/181 382/103 |
| 2018/0232592 A1* | 8/2018 | Stewart | G08B 13/19606 |
| 2018/0336435 A1* | 11/2018 | Takeuchi | G06N 3/0454 |
| 2019/0012547 A1* | 1/2019 | Togashi | G06K 9/00778 |
| 2019/0042854 A1* | 2/2019 | Sanjay | G10L 25/63 |
| 2019/0102612 A1* | 4/2019 | Takemoto | G06K 9/00778 |
| 2019/0108561 A1* | 4/2019 | Shivashankar | G06K 9/00624 |
| 2019/0149747 A1* | 5/2019 | Keskikangas | G08B 13/196 348/36 |
| 2019/0156157 A1* | 5/2019 | Saito | G06K 9/00369 |
| 2019/0156261 A1* | 5/2019 | Nishino | G06K 9/3241 |
| 2019/0180447 A1* | 6/2019 | Komiya | G06K 9/6227 |
| 2019/0197313 A1* | 6/2019 | Iwanaga | G06T 7/11 |
| 2019/0206066 A1* | 7/2019 | Saleemi | G06K 9/00785 |
| 2019/0231231 A1* | 8/2019 | Saria | A61B 5/1128 |
| 2019/0362183 A1* | 11/2019 | Thiebaut | G06K 9/00744 |
| 2020/0134321 A1* | 4/2020 | Chen | G06K 9/00369 |
| 2020/0169699 A1* | 5/2020 | Heydlauf | G06K 9/00771 |
| 2020/0250434 A1* | 8/2020 | Jeong | G06K 9/00718 |
| 2020/0410275 A1* | 12/2020 | Higa | G06K 9/00369 |
| 2021/0064885 A1* | 3/2021 | Mori | G06Q 50/26 |

* cited by examiner

INFORMATION PROCESSING APPARATUS FOR PRESENTING LOCATION TO BE OBSERVED, AND METHOD OF THE SAME

BACKGROUND OF THE INVENTION

Field of the Invention

The present disclosure relates to an information processing apparatus for presenting a location to be observed, and a method of the same.

Description of the Related Art

In recent years, there has been proposed a function for presenting a portion to be particularly observed by human eyes in a picture captured by a monitoring camera for a long time to reduce a burden on a worker or reduce oversight.

For example, Japanese Patent Application Laid-Open No. 2014-182628 proposes a method of calculating a coordinate of an area being focused on, based on a viewing field mage of an observer and a real space map, and calculating an importance degree of the area using the frequency of observation and job knowledge.

In addition, Japanese Patent Application Laid-Open No. 2015-056697 proposes a method of detecting a warning from a passerby and calculating an attention degree for each camera in accordance with a warning position and the number of warnings.

SUMMARY OF THE INVENTION

In the aforementioned methods, a location to be observed is presented based on a situation of a site being monitored. Nevertheless, even if the knowledge of the monitored site is obtained, the knowledge cannot be reflected in information regarding a location to be observed, and feedback from the site cannot be obtained. For example, among locations obtained as locations to be observed, locations that have already been sufficiently observed by a watchman, and locations that have not been sufficiently observed are equally presented as locations to be observed, and it is difficult to confirm whether these locations have been exhaustively observed.

According to an aspect of the present disclosure, an information processing apparatus includes a first setting unit configured to set a plurality of observation necessity degrees of positions in a real space and times, a first display unit configured to display the plurality of observation necessity degrees mapped based on a position in the real space and a time, a second display unit configured to display a plurality of targets detected from a captured image, based on observation necessity degrees each corresponding to a different one of the plurality of targets, and a receiving unit configured to receive an input of information corresponding to at least one target of the plurality of targets. The first setting unit resets at least one observation necessity degree of the plurality of observation necessity degrees based on the input information.

Further features of the present disclosure will become apparent from the following description of exemplary embodiments with reference to the attached drawings.

DESCRIPTION OF THE EMBODIMENTS

Exemplary embodiments will be described below with reference to the drawings.

Figure 1:
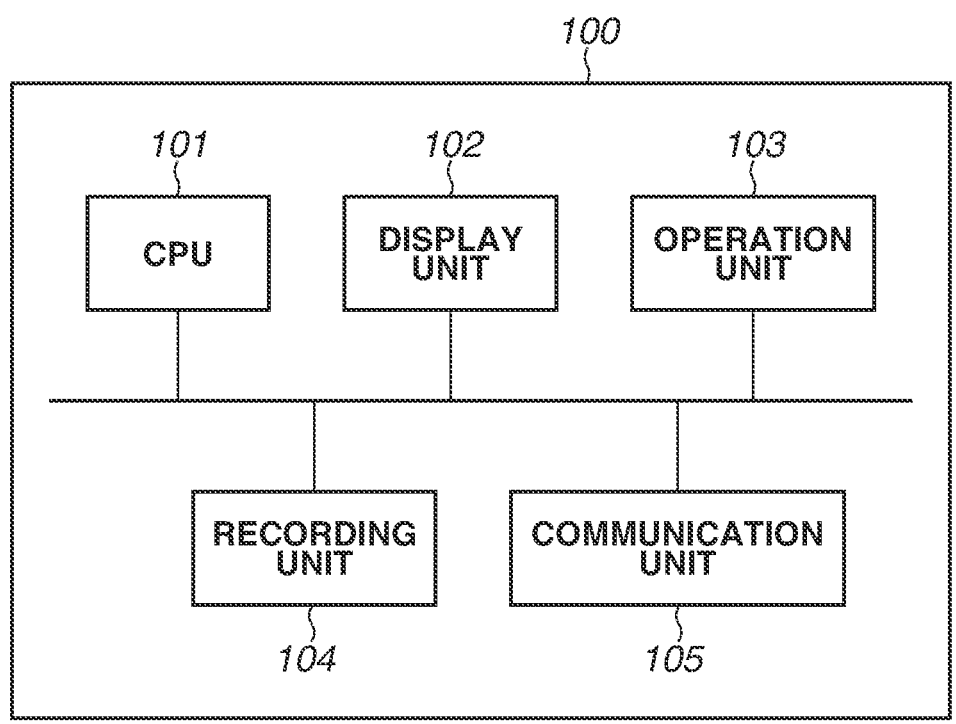
FIG. 1 is a diagram illustrating an example of a hardware configuration of an information processing apparatus.

FIG. 1 is a diagram illustrating an example of a hardware configuration of an information processing apparatus 100 according to a first exemplary embodiment.

As hardware configurations, the information processing apparatus 100 includes a central processing unit (CPU) 101, a display unit 102, an operation unit 103, a recording unit 104, and a communication unit 105.

The CPU 101 controls the entire information processing apparatus 100. The display unit 102 includes a liquid crystal screen or the like, and displays pictures or the like that have been captured by a plurality of monitoring cameras connected with the information processing apparatus 100 via a network or the like. A picture captured by a monitoring camera serves as an example of a captured image. The operation unit 103 includes a switch, a touch panel, or the like, and inputs operation information by sensing an operation performed by a user. In place of the touch panel, other pointing devices, such as a mouse and a trackball, may be used. The recording unit 104 includes a recording medium, such as a hard disc, or the like, and sequentially stores pictures captured by a plurality of monitoring cameras, together with metadata information, such as a shooting time and a shooting camera parameter.

In place of the recording medium, the information processing apparatus 100 may use, as the recording unit 104, a storage on a network, such as a network attached storage (NAS) or a storage area network (SAN). The communication unit 105 connects the information processing apparatus 100 to a network or the like, and controls communication with a monitoring camera, or the like.

Figure 2:
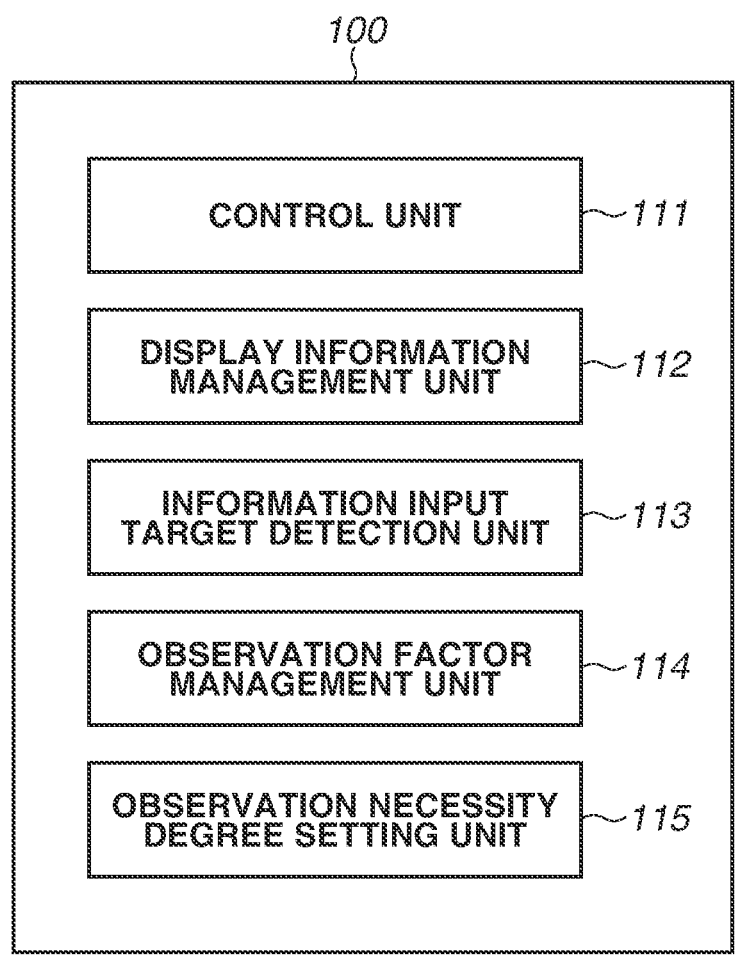
FIG. 2 is a diagram illustrating an example of a functional configuration of the information processing apparatus.

By the CPU 101 executing processing based on programs recorded on the recording unit 104, undermentioned functional configurations of the information processing apparatus 100 illustrated in FIG. 2, and pieces of processing in flowcharts illustrated in FIGS. 4, 6, 8, 10, and 13 are implemented. As another example, at least part of functions of the information processing apparatus 100 may be implemented by cooperation between a plurality of CPUs and storage units, for example. In addition, as yet another example, at least part of the functions of the information processing apparatus 100 may be implemented using a hardware circuit. In addition, as yet another example, the functions of the information processing apparatus 100 may be implemented by cooperation between a plurality of devices.

FIG. 2 is a diagram illustrating an example of a functional configuration of the information processing apparatus 100.

As functional configurations, the information processing apparatus 100 includes a control unit 111, a display information management unit 112, an information input target detection unit 113, an observation factor management unit 114, and an observation necessity degree setting unit 115. The control unit 111 controls the entire information processing apparatus 100. The display information management unit 112 manages a display screen of the display unit 102 and creates a user interface (UI) screen on which the user performs operations.

The information input target detection unit 113 detects an information input target as a target for which the user inputs information. Using pictures captured by monitoring cameras, information recorded on the recording unit 104, and the like, the information input target detection unit 113 detects a predetermined object, a state, information, or the like as an information input target, and estimates a position in a real space.

The observation factor management unit 114 acquires information serving as a factor (observation factor) for determining that the target is to be observed, and determines a value of the observation factor as the magnitude of a degree of the factor. In addition, the observation factor management unit 114 manages each importance degree of a different one of a plurality of observation factors. Specific observation factors will be described below in more detail. As information for determining a value of an observation factor, the following types of information are used. Examples of information to be used include pictures captured by monitoring cameras, an operation history of operations performed by the user using the operation unit 103, information recorded on the recording unit 104, an information input target detected by the information input target detection unit 113, and an attribute of the information input target.

In addition, the observation factor management unit 114 obtains information by communicating with an external system or service provided outside the information processing apparatus 100, and determines a value of an observation factor using the information obtained from the system or service. Using the information regarding an observation factor that has been obtained by the observation factor management unit 114, the observation necessity degree setting unit 115 sets an observation necessity degree of a position in the real space.

Figure 3:
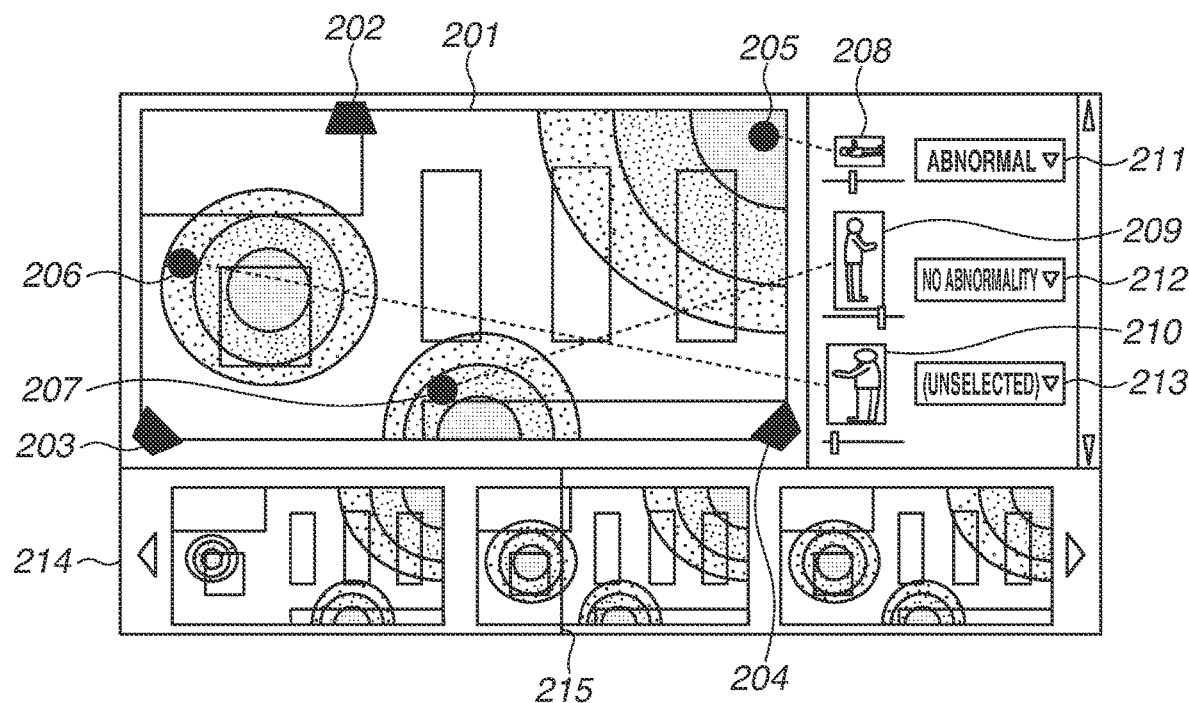
FIG. 3 is a schematic diagram illustrating a user interface screen according to a first exemplary embodiment.

Next, display on the display unit 102 and an operation of the user will be described using FIG. 3. FIG. 3 is a schematic diagram illustrating a user interface screen that is displayed on the display unit 102 and controlled by the display information management unit 112. The user aims to view each individual person who has appeared in a monitoring picture recorded in the past, and add label information indicating whether the person is abnormal. The added label is used afterward for learning a statistical model of abnormal behaviors or reviewing a security plan by analyzing a monitoring status.

First of all, the display information management unit 112 displays a plan view image 201 of a monitoring range on the display unit 102. The plan view image 201 also serves as an example of observation necessity degree display. The display information management unit 112 maps information regarding an observation necessity degree set by the observation necessity degree setting unit 115, onto a corresponding position in the plan view image 201, and displays the mapped information. The information regarding an observation necessity degree is displayed as a heat map expressed by color shading. In the heat map, a darker color indicates a higher observation necessity degree.

In the example illustrated in FIG. 3, monitoring cameras 202, 203, and 204 are installed at three points illustrated in FIG. 3, and oriented in the directions illustrated in FIG. 3.

In addition, as an example of information input target display, the information input target detection unit 113 detects human bodies from pictures of the monitoring cameras. Then, the display information management unit 112 displays, as a list, person pictures 208, 209, and 210 arranged in tandem. In addition, on the plan view image 201, the display information management unit 112 displays markers 205, 207, and 206 indicating positions, and also displays connecting lines indicating correspondences between the respective markers and person pictures.

The person pictures 208, 209, and 210 are moving images. The user can control times for reproducing person pictures to be displayed, by operating sliders provided below the respective moving images. In addition, if the sliders are moved, the corresponding markers on the plan view image 201 also move to the positions at the times indicated by the respective sliders.

The display information management unit 112 displays the person pictures 208, 209, and 210 in a manner sorted from the top in descending order of observation necessity degree in the plan view image 201. Such display can preferentially present, to the user, a person picture of a person found at a position with a high observation necessity degree. The user adds pieces of label information indicating whether persons are abnormal, by selecting "abnormal" or "no abnormality" from drop-down lists 211, 212, and 213 disposed next to the respective person pictures. For example, because the person picture 208 is a picture showing a collapsed person, the user sets "abnormal" selected from the corresponding drop-down list 211. In addition, because the person picture 209 shows a normally-walking person, the user sets "no abnormality" selected from the corresponding drop-down list 212. The display information management unit 112 accumulates, onto the recording unit 104, pieces of information added in this manner.

By controlling a timeline 214, the user can change a time of heat maps to be displayed in the plan view image 201. In the timeline 214, thumbnails of plan view images are displayed side by side along a time axis extending from the left to the right. By moving a cursor 215 to the left or right, the user can select a time. If the time is changed, heat maps indicating observation necessity degrees in the plan view image 201 are updated, and a list of person pictures is also updated to a list of person pictures showing human bodies found at the time.

Each time label information is added, the observation necessity degree setting unit 115 recalculates an observation necessity degree by adding the added label information. The display information management unit 112 updates the display based on the recalculated observation necessity degree. In this example, a person to whom the information has been added is a person viewed by the user, and the state of the person has already been confirmed by the user. Thus, the observation necessity degree setting unit 115 reduces an observation necessity degree of the person who has "already been observed". Accordingly, if the information is added, color density of the peripheral of the person in a heat map is decreased. Also in the thumbnails in the timeline 214, if there is a person to whom information is added at the time, an observation necessity degree is recalculated and thumbnail images are updated as well. With this configuration, if the user intensively observes points with high observation necessity degrees and adds pieces of label information by selecting times and locations that have high observation necessity degrees, observation necessity degrees of all the pictures are reduced. This helps the user to find out a point to be observed for adding label information, and also helps the user to check the progress of a work.

Figure 4:
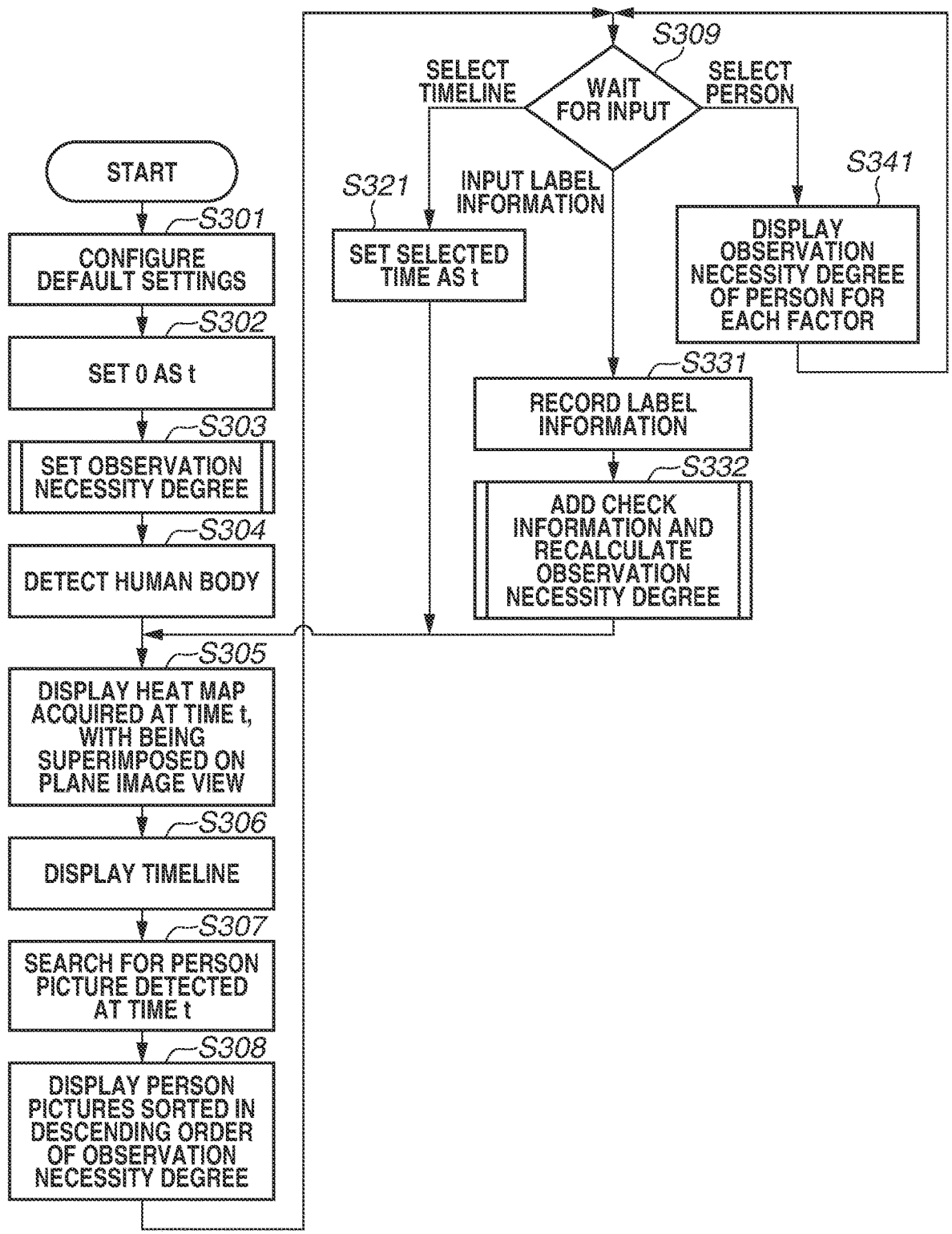
FIG. 4 is a flowchart illustrating an example of basic information processing according to the first exemplary embodiment.

Next, processing for implementing the aforementioned operation will be described using FIG. 4.

In step S301, the control unit 111 receives environmental information desired as a work environment and designated by the user via the operation unit 103, and sets the environment. The environmental information to be designated includes a plan view image of a site, one or a plurality of captured pictures, a shooting time, information regarding a camera position and height, and a weight of an observation factor managed by the observation factor management unit 114. The picture is a picture captured by the monitoring camera in advance and recorded on the recording unit 104. The picture may be an individual moving image file or may be a picture extracted from pictures accumulated in a database or a video management system (VMS), by designating a time and date range. In addition, picture stream of a camera may be designated, and the user may add information while sequentially recording pictures onto the recording unit 104.

Next, in step S302, the display information management unit 112 sets 0 as a default time t of displaying. The display information management unit 112 sets a time of a picture to be initially displayed, to the beginning of the picture. As the default time t, the display information management unit 112 may set a time at which a work has been stopped the last time, or a time with the highest observation necessity degree.

Next, in step S303, based on the designated environmental information, the observation necessity degree setting unit 115 sets observation necessity degrees of a target location and all of the times. Through the processing, values of observation necessity degrees ranging from 0 to 1 are respectively set to coordinates in the plan view image and times, and values used for displaying heat maps of observation necessity degrees are prepared. A method of setting an observation necessity degree will be described below. The processing in step S303 serves as an example of first display processing of displaying the plurality of observation necessity degrees with being mapped based on a position in the real space and a time.

Next, in step S304, based on the designated environmental information, the information input target detection unit 113 detects persons from pictures of a target location and time and estimates positions of the respective persons using methods of human detection and moving object tracking. In addition, using a human reidentification method, the information input target detection unit 113 determines whether persons appeared in pictures captured by different cameras and pictures captured at different time slots are an identical person, and adds ID numbers each uniquely allocated to an identical person, to detected persons.

An information input target to be detected by the information input target detection unit 113 is not limited to a person. For example, the information input target detection unit 113 may detect an object such as an automobile when a road is to be monitored. Alternatively, a cow or sheep may be regarded as information input target when a stock farm is to be monitored. Alternatively, all moving objects may be regarded as information input targets without specifying types. In addition, an information input target is not limited to an object. For example, a region in the real space, a specific time, specific behavior of a person, a specific state of a device such as a camera, or the generation of a warning or the like may be regarded as an information input target.

In addition, results to be obtained in steps S303 and S304 may be prerecorded based on pictures recorded on the recording unit 104, and the results may be read in this flow. This is effective when the calculation of an observation necessity degree or human detection takes time. In addition, in the case of performing serial processing on picture stream, the pieces of processing in steps S303 and S304 are concurrently performed on the input of stream, and the calculation of an observation necessity degree and human detection are serially performed.

Next, in step S305, the display information management unit 112 displays an observation necessity degree acquired at the time t, with being superimposed on the plan view image. The display information management unit 112 acquires, from the observation necessity degree setting unit 115, observation necessity degrees of the respective coordinates at the time t, and adds red shading, for example, to each of the coordinates in the plan view image. More specifically, when each color pixel value of a coordinate is represented by an RGB color ranging from 0 to 255, the display information management unit 112 adds, to a red (R) component, a value obtained by multiplying an observation necessity degree by 255, and if the resultant value exceeds 255, the value is regarded as 255.

A display method of a heat map is not limited to this, and a heat map may be displayed based on the intensity of another color such as blue color, green color, or white color, or the intensity of lightness, saturation, or hue. In the case of a monochrome picture, a heat map may be displayed based on the density of a dot pattern. Alternatively, using a stereoscopic image, the display information management unit 112 may represent an observation necessity degree as a length of a bar or the like that extends in a vertical direction from a corresponding point in a plan view image.

Next, in step S306, the display information management unit 112 creates a display image of a timeline centered on the time t, and displays the created display image on the display unit 102. For example, the display information management unit 112 acquires, from the observation necessity degree setting unit 115, observation necessity degrees of a time (t−10 seconds), the time t, and a time (t+10 seconds), creates thumbnail images using a method similar to the method used in step S304, and arrays the reduced thumbnail images in chronological order.

The number of thumbnail images to be displayed and a display range are not limited to these. For example, the display information management unit 112 may variably set the number of thumbnail images to be displayed, in accordance with a breadth of the screen of the display unit 102.

Next, in step S307, among persons detected by the information input target detection unit 113, the display information management unit 112 acquires persons appeared at the time t.

Next, in step S308, the display information management unit 112 acquires, from the observation necessity degree setting unit 115, observation necessity degrees corresponding to positions of the respective persons appeared at the time t, and displays the observation necessity degrees sorted in descending order of observation necessity degree. The processing in step S308 serves as an example of second display processing of displaying a plurality of targets detected from a captured image, based on observation necessity degrees corresponding to the plurality of respective targets.

Through the above-described pieces of processing from steps S305 to S308, a UI screen at the time t is formed by the display information management unit 112 and is displayed on the display unit 102.

Next, in step S309, the display information management unit 112 waits for an operation of the user that is to be performed on the UI screen via the operation unit 103, and the processing branches depending on an input operation. If the user selects a timeline using the operation unit 103, the processing proceeds to step S321. If the user changes label information by selecting from the drop-down list 211 for designating label information as illustrated in FIG. 3, or the like, using the operation unit 103, the processing proceeds to step S331. If the user designates a person picture using the operation unit 103, the processing proceeds to step S341. The processing in step S309 serves as an example of receiving processing of receiving an input of information corresponding to at least one target of the plurality of targets.

In step S321, the display information management unit 112 acquires a position on the screen of the timeline that has been selected using the operation unit 103, and newly sets a time on the timeline that corresponds to the position, as a time t.

Subsequent to step S321, the processing proceeds to step S305, in which the display information management unit 112 updates the display screen based on the new time t, and in step S309, the display information management unit 112 waits for an input again.

In step S331, the display information management unit 112 records a new value of a drop-down list selected using the operation unit 103, onto the recording unit 104 as label information of a corresponding person. In addition, the display information management unit 112 also records, onto the recording unit 104, information regarding the time t of the UI screen displayed when the operation is performed.

Next, in step S332, similarly to step S303, the observation necessity degree setting unit 115 calculates and updates an observation necessity degree. The processing in step S332 serves as an example of processing of resetting at least one observation necessity degree of the plurality of observation necessity degrees based on the input information. In addition, the processing in step S332 also serves as an example of processing of resetting an observation necessity degree associated with a target related to the input information, based on the input information. As described below, the observation necessity degree setting unit 115 calculates an observation necessity degree also using information indicating whether label information has been input. An observation necessity degree of a portion for which label information has been input consequently decreases.

Subsequent to step S332, the processing proceeds to step S305, in which the display information management unit 112 updates the display screen based on the updated observation necessity degree, and in step S309, the display information management unit 112 waits for an input again. The processing serves as an example of processing of displaying the reset observation necessity degree mapped based on a position in the real space and a time. In step S341, the display information management unit 112 acquires, from the observation factor management unit 114, a factor value of each observation factor at the position at the time t of a person designated using the operation unit 103, and displays the factor value.

Figure 5:
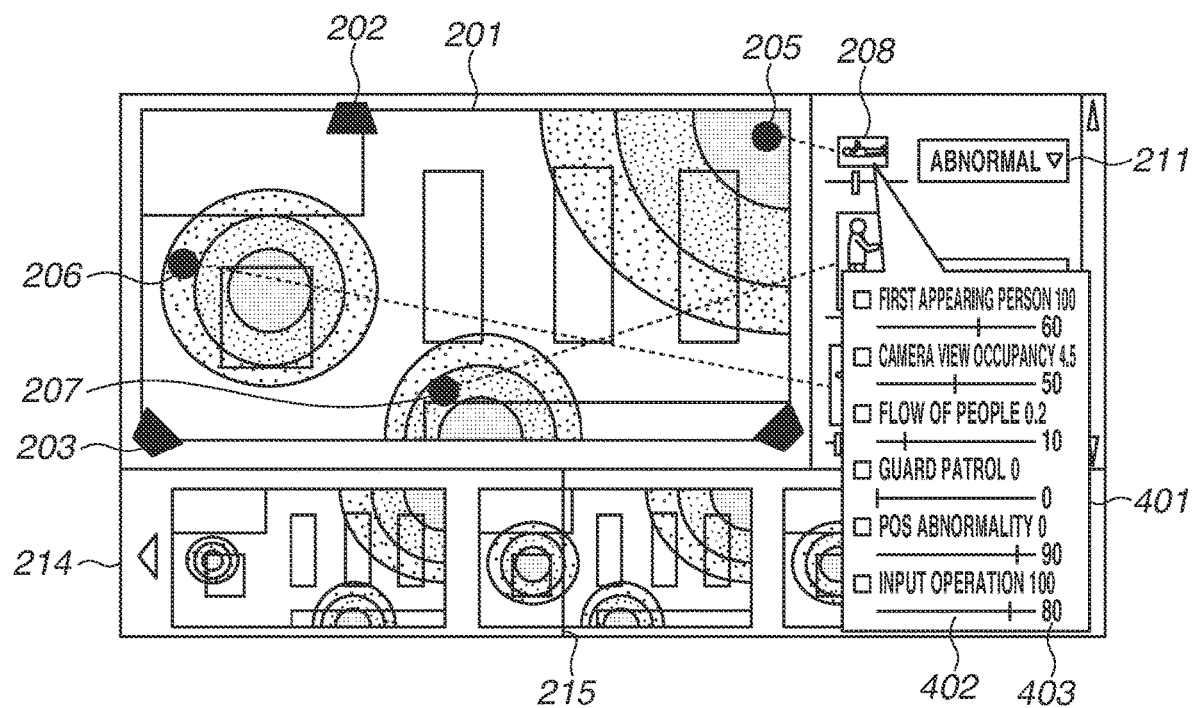
FIG. 5 is a diagram illustrating an example of display of an observation factor window.

FIG. 5 illustrates a display example of observation factors. If the person picture 208 is selected, the display information management unit 112 displays an observation factor window 401. The processing of displaying the observation factor window 401 serves as an example of third display processing of displaying the one or the plurality of observation factors used in setting of at least one observation necessity degree of the plurality of observation necessity degrees. In addition, the processing of displaying the observation factor window 401 if the person picture 208 is selected also serves as an example of processing of displaying the one or the plurality of observation factors used in setting of an observation necessity degree associated with a target related to the input information.

In the present exemplary embodiment, observation factors include a first appearing person, camera view occupancy, a flow of people, guard patrol, a Point of Sale (POS) record, and an input operation.

The observation necessity degree setting unit 115 sets an observation factor of a first appearing person depending on whether a person detected by the information input target detection unit 113 is a newly-appearing person. Using an ID number allocated by the information input target detection unit 113 to each person, the observation necessity degree setting unit 115 sets 100 as a value of an observation factor at a position at which a corresponding person appears, if a new ID number is allocated for the first time to the person in a person picture, and sets 0 as the value of the observation factor if not.

The observation necessity degree setting unit 115 sets an observation factor of camera view occupancy based on a size and a position of a person picture in a camera field angle of a monitoring camera that has captured a picture of a person detected by the information input target detection unit 113. More specifically, for all the monitoring cameras, the observation necessity degree setting unit 115 calculates a product of a reciprocal of a ratio between an area of a rectangle surrounding a person in a person picture and an area of the entire camera picture, and an angle formed by a direction of the center of the person picture and a camera optical axis, and sums up the calculated products. The observation necessity degree setting unit 115 sets a higher value of an observation factor as the picture gets smaller, the person gets farther from the center of the camera field angle, and the number of cameras capturing the person gets smaller.

The observation necessity degree setting unit 115 sets an observation factor of a flow of people for each position in the plan view image in accordance with an amount of traffic of people detected by the information input target detection unit 113. For example, the observation necessity degree setting unit 115 draws, on the plan view image, a circle with a radius of 10 m that is centered on a target position. Then, the observation necessity degree setting unit 115 calculates a total sum of lengths of trajectories of people who have passed through the inside of the circle within the last five minutes, for example, and multiplies a reciprocal of the total sum by 100. The observation necessity degree setting unit 115 sets a higher value of an observation factor as the number of people who have passed through the neighborhood at the last minute gets smaller.

Based on a guard patrol record of an external security system, the observation necessity degree setting unit 115 sets an observation factor of guard patrol for each position in the plan view image. For example, the observation necessity degree setting unit 115 draws, on the plan view image, a circle with a radius of 30 m that is centered on a target position. Then, the observation necessity degree setting unit 115 determines whether guard patrol has been performed in the circle within the last 60 minutes, for example, and divides a time elapsed from the last patrol by 60 minutes. The observation necessity degree setting unit 115 sets a higher value of an observation factor as time elapsed from when the guard has patrolled gets more.

Based on a record of an external POS, the observation necessity degree setting unit 115 sets an observation factor of POS information. If the observation necessity degree setting unit 115 obtains, from the POS, information indicating that inventory information of a predetermined store shelf is inconsistent with a sales record of the POS, the observation necessity degree setting unit 115 sets 100 as a value of an observation factor in the periphery of the store shelf.

Based on information input by the user using the operation unit 103, the observation necessity degree setting unit 115 sets an observation factor of an input operation. If the user performs an input to a drop-down list for a certain person at the time t, for example, the observation necessity degree setting unit 115 sets a negative value of an observation factor such as −50 in the periphery of a position of a corresponding person at a time around the time t. Based on the input, the observation necessity degree setting unit 115 estimates that the user has performed observation, and reduces an observation necessity degree of the person.

On the observation factor window 401, the descriptions of the respective observation factors and values of the respective observation factors in the selected person picture 208 are displayed. In addition, a slide bar 402 and a weight 403 are displayed together for each observation factor. The user can change a weight of an observation factor by operating a slide bar using the operation unit 103. The processing in which the observation necessity degree setting unit 115 changes a weight of an observation factor based on an operation of a slide bar that is performed by the user serves as an example of second setting processing of setting the respective importance degrees of the one or the plurality of observation factors. In addition, the processing also serves as an example of processing of setting the respective importance degrees of the one or the plurality of observation factors based on a user operation.

The observation factor window 401 illustrated in FIG. 5 is an example of observation factor display, and the observation necessity degree setting unit 115 may display a weight using a bar graph or a circle graph, for example. In addition, as a method of observation factor importance degree setting, the user may directly input a weight instead of operating a slide bar, or may input a weight using a toggle switch for selecting 0 or 100.

Based on a value and a weight of an observation factor that are obtained in the above-described manner, the observation necessity degree setting unit 115 calculates an observation necessity degree.

Figure 6:
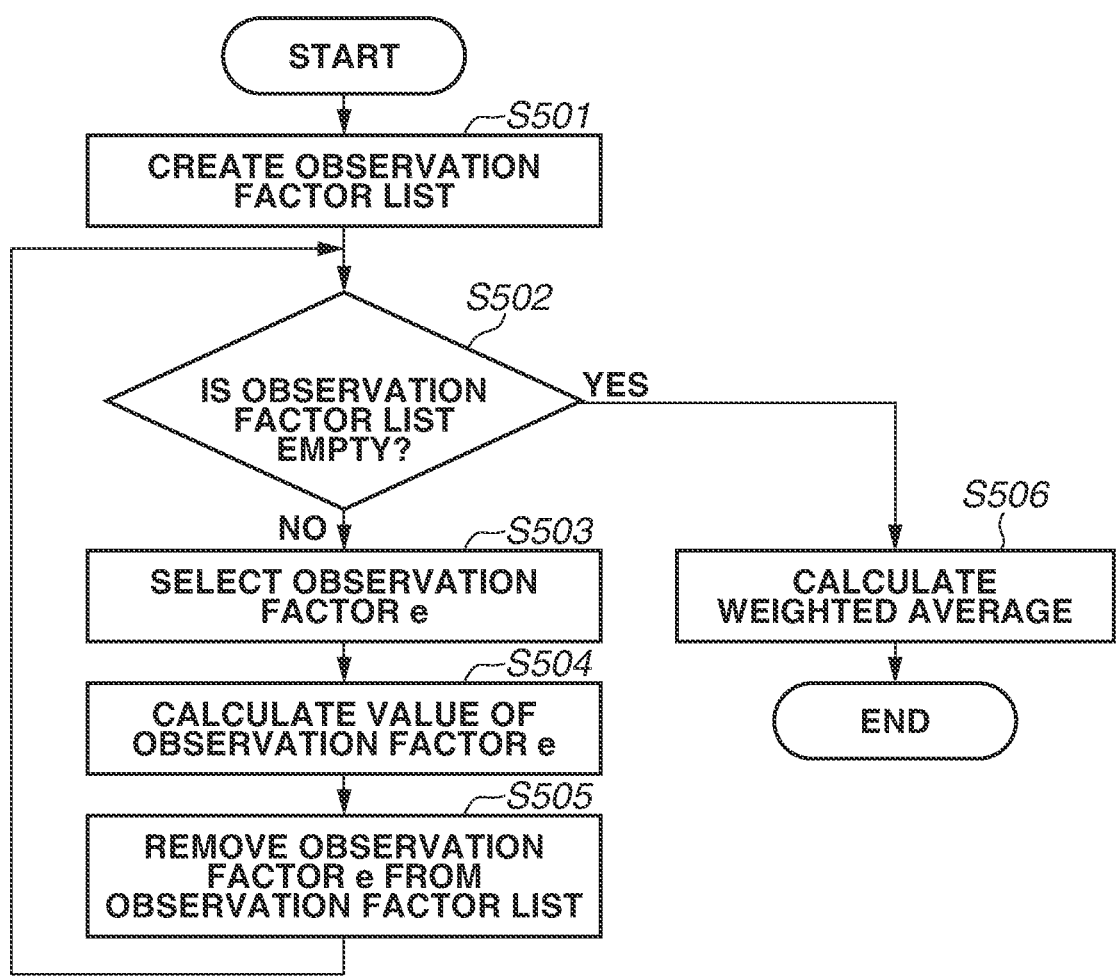
FIG. 6 is a flowchart illustrating an example of processing for setting an observation necessity degree.

The processing for the observation necessity degree setting unit 115 setting an observation necessity degree in steps S303 and S332 will be described using FIG. 6.

First of all, in step S501, the observation necessity degree setting unit 115 creates a list including observation factors managed by the observation factor management unit 114. In this example, for listing observation factors to be used in the calculation of an observation necessity degree, the observation necessity degree setting unit 115 excludes an observation factor having a weight designated to 0, and an observation factor unusable due to an external condition. For example, when connection to an external POS is disabled, the observation necessity degree setting unit 115 excludes an observation factor of POS information.

Next, in step S502, the observation necessity degree setting unit 115 determines whether an observation factor list is empty. If the observation factor list is not empty, the processing proceeds to step S503, and if the observation factor list is empty, the processing proceeds to step S506.

In step S503, the observation necessity degree setting unit 115 selects one observation factor from observation factors included in the observation factor list, and sets the one observation factor as an observation factor e.

Next, in step S504, the observation necessity degree setting unit 115 calculates a value of the observation factor e. For example, if the observation factor e is an observation factor of a first appearing person, as described above using FIG. 5, the observation necessity degree setting unit 115 sets 100 as a value of an observation factor at a position at which a corresponding person appears, if a new ID number is allocated for the first time to the person in a person picture, and sets 0 as the value of the observation factor if not. The observation necessity degree setting unit 115 also obtains values of the other observation factors as described above using FIG. 5.

Next, in step S505, the observation necessity degree setting unit 115 removes the observation factor e from the observation factor list, and the processing returns to step S502.

If it is determined in step S502 that the observation factor list is empty, after completion of the calculation of values of all the observation factors, the processing proceeds to step S506.

In step S506, the observation necessity degree setting unit 115 calculates a weighted average using the following formula, for each time and real space position, and represents the calculated weighted average as an observation necessity degree A(x, t) at the time t and a real space position x:

$$A(x, t) = \left(\sum_{e \in L} w_e A_e(x, t)\right) \bigg/ \left(\sum_{e \in L} w_e\right),$$

where a term L represents an observation factor list created in step S501. A term $A_e(x, t)$ represents a value of the observation factor e at the time t and the real space position x. A term $w_e$ represents a weight of the observation factor e. In this formula, A(x, t)=0 is obtained if the observation factor list L is empty.

A calculation method of an observation necessity degree is not limited to the method described above. For example, the observation necessity degree setting unit 115 may calculate an observation necessity degree by calculating an average of logarithmic values, by adding observation necessity degrees and then clipping an upper limit value, or calculating a product of a weight and a value for each observation factor e and then selecting the largest value.

The information processing apparatus 100 of the present exemplary embodiment sets an observation necessity degree in a work target picture, and performs display based on the observation necessity degree. The user can thereby preferentially observe a target to be observed, and perform a labeling work.

In the first exemplary embodiment, the user needs to manually set a weight of an observation factor and set a factor to be emphasized in calculating an observation necessity degree. Nevertheless, if the information processing apparatus 100 estimates a factor emphasized by the user, and automatically sets a weight, a work of the user can be reduced.

In a second exemplary embodiment, it is possible to estimate a weight $w_e$ of an observation factor from an operation history of the user. The second exemplary embodiment is configured by adding some configurations to the first exemplary embodiment, and the difference between them will be described below.

Figure 7:
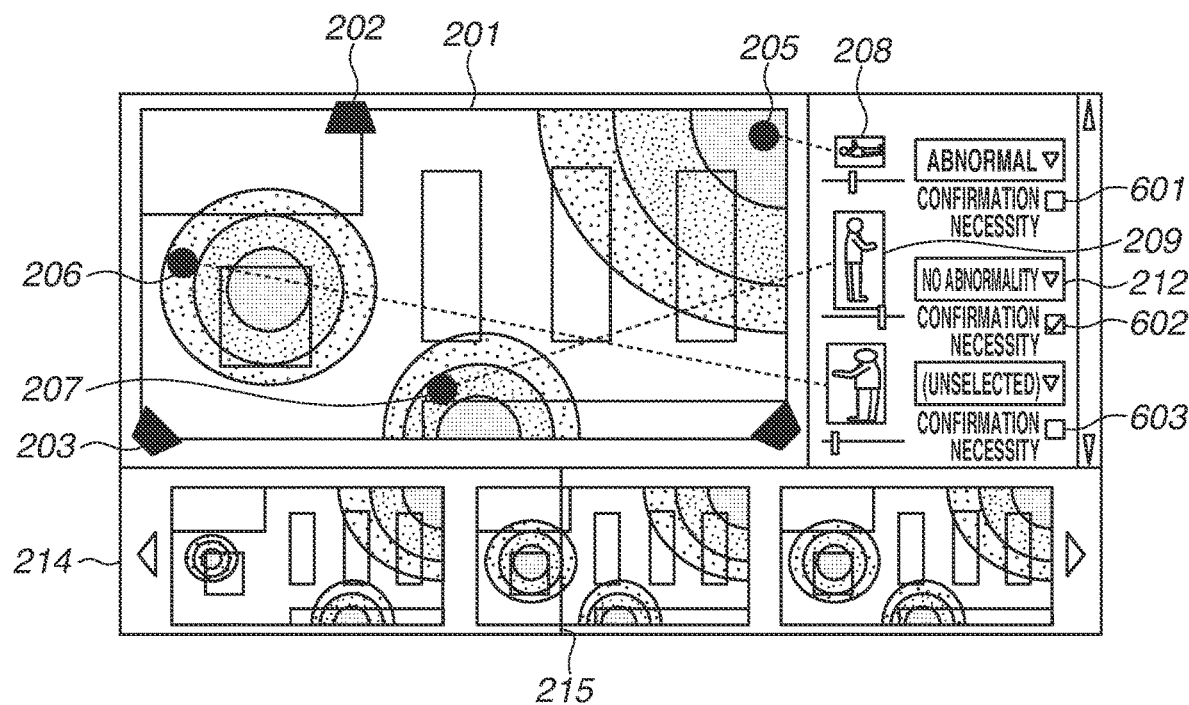
FIG. 7 is a schematic diagram illustrating a user interface screen according to a second exemplary embodiment.

FIG. 7 is a schematic diagram illustrating a user interface screen that is to be displayed on a display unit 102 of the second exemplary embodiment, and controlled by a display information management unit 112. In the user interface screen illustrated in FIG. 7, confirmation necessity checkboxes 601, 602 and 603 are added to the user interface screen illustrated in FIG. 3.

These confirmation necessity checkboxes 601, 602 and 603 are provided for the respective person pictures, and added for the purpose of ticking the checkboxes if the user determines that the person pictures need to be confirmed. In the example illustrated in FIG. 7, the user views the person picture 209 and determines that there is no abnormality in the person picture itself, and selects "no abnormality" from the drop-down list 212. Nevertheless, at the same time, the user determines that the person picture is to be confirmed with care because there is a high possibility that abnormality is caused later as seen from abnormal walking, for example, and ticks the corresponding confirmation necessity checkbox 602.

At this time, regarding a time at which a person having the same ID as a person with a ticked confirmation necessity checkbox appears again, the observation necessity degree setting unit 115 increases an observation necessity degree of the corresponding point. The observation necessity degree setting unit 115 prompts the user to observe an appearance range of a person regarded as being in need of confirmation.

Additionally, the display information management unit 112 records inputs to the confirmation necessity checkboxes onto the recording unit 104. Based on the input record, the observation factor management unit 114 resets a weight of an observation factor.

Figure 8:
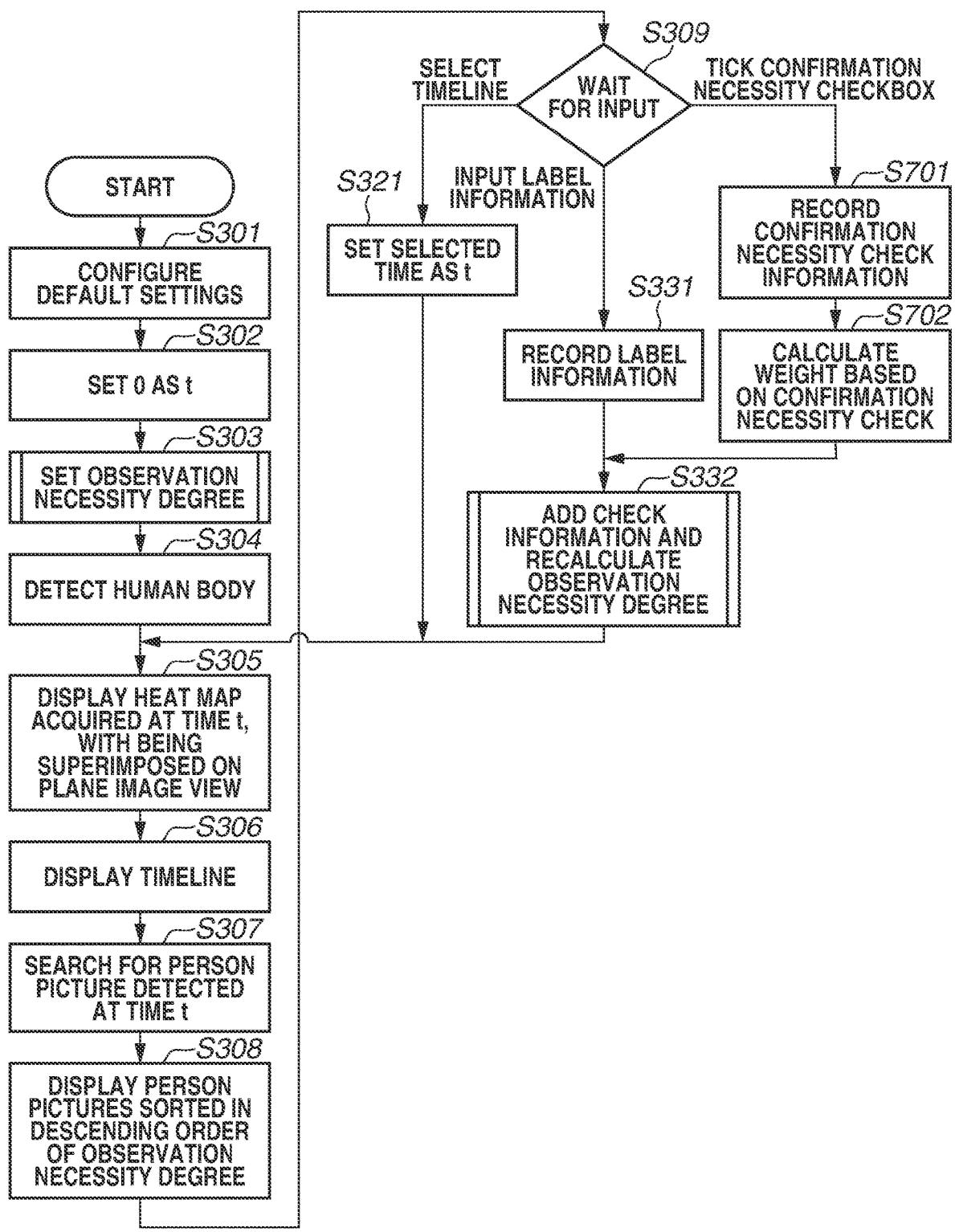
FIG. 8 is a flowchart illustrating an example of basic information processing according to the second exemplary embodiment.

Next, processing for implementing the above-described operation will be described using FIG. 8. A flowchart illustrated in FIG. 8 corresponds to the flowchart illustrated in FIG. 4 in the first exemplary embodiment. Differences between FIGS. 8 and 4 will be described below.

In the present exemplary embodiment, because a weight of an observation factor is automatically set, the processing in step S341 is omitted, and the observation factor window 401 is not displayed even if a person picture is selected.

Nevertheless, an observation factor may be made automatically-settable as well as manually-settable without omitting the processing in step S341.

In step S309, if the display information management unit 112 detects the tick of a confirmation necessity checkbox as an input performed using the operation unit 103, the processing proceeds to step S701.

In step S701, the display information management unit 112 records, onto the recording unit 104, a changed state of the confirmation necessity checkbox operated using the operation unit 103, and information indicating whether the confirmation necessity checkbox has been ticked, as information associated with a corresponding person.

Next, in step S702, based on the information regarding the state of the confirmation necessity checkbox that is recorded on the recording unit 104, the observation factor management unit 114 determines a weight of an observation factor.

Using an observation necessity degree of a person with the ticked confirmation necessity checkbox, the observation factor management unit 114 calculates a weight $w_e$ of an observation factor e according to the following formula:

$$w_e = v_e \left( \frac{\sum_{h \in H} a_h(e)}{\sum_{l \in L} \sum_{h \in H} a_h(l)} \right),$$

where a term $v_e$ represents a preset default value of the observation factor e, a term H represents a set of persons with ticked confirmation necessity checkboxes, and a term L represents a set of observation factors. A term $a_h(e)$ represents a representative value of the observation factor e of a person h, and is defined by the following formula. A term $T_h$ represents a set of times at which the person h appears.

$$a_h(e) = \max_{t \in T_h}(A_e(x_h(t), t))$$

The term $v_e$ is predefined in accordance with an importance degree of each observation factor before the shipment of the information processing apparatus 100. In addition, the term $v_e$ may be uniformly defined as 1 irrespective of an observation factor, or the control unit 111 may set the term $v_e$ in accordance with a setting operation performed by the user via the operation unit 103. In addition, the term $v_e$ is used as a weight of the observation factor e in the setting of an observation necessity degree in step S303. The processing in step S702 serves as an example of processing of estimating and setting the respective importance degrees of the one or the plurality of observation factors based on an operation history of a user operation.

In addition, a method of setting a weight of an observation factor is not limited to the method described above. For example, the observation factor management unit 114 may create a statistical model such as Gaussian distribution of each observation factor for a person with a ticked confirmation necessity checkbox, and set a weight based on the created statistical model. Alternatively, the observation factor management unit 114 may use a model optimized using deep learning (DL) or the like in which a value of an observation factor serves as an input vector, and a binary value of an input operation of a confirmation necessity checkbox serves as an output.

Subsequent to step S702, the processing proceeds to step S332, in which the observation necessity degree setting unit 115 recalculates an observation necessity degree in accordance with the new weight of the observation factor. Then, in step S305, the display information management unit 112 updates the display screen based on the updated observation necessity degree.

The information processing apparatus 100 of the present exemplary embodiment can automatically set a weight of an observation factor.

In a third exemplary embodiment, as a method of using an observation necessity degree that is different from the method in the first and second exemplary embodiments, a method of searching a picture having the appearance of a desired person using an observation necessity degree will be described.

Figure 9A:
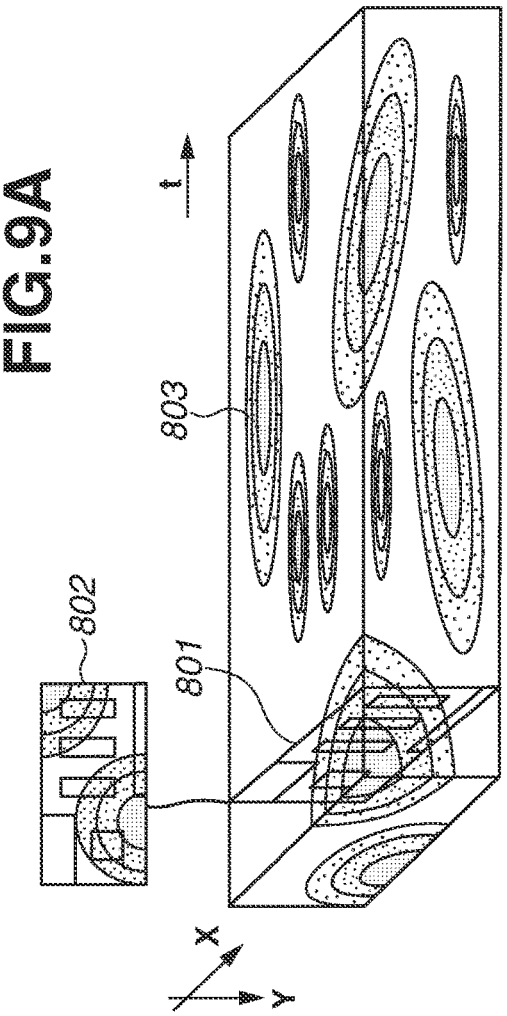
FIGS. 9A and 9B are schematic diagrams each illustrating a user interface screen according to a third exemplary embodiment.
Figure 9B:
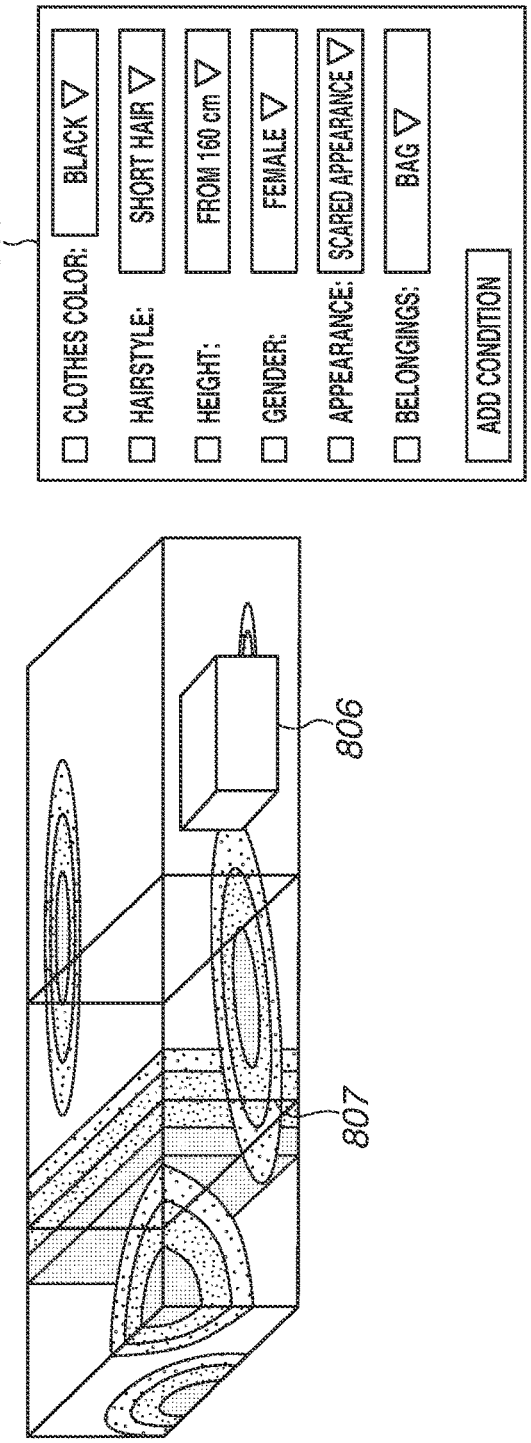

An operation on a display unit and an operation of the user in the present exemplary embodiment will be described using FIGS. 9A and 9B. In the present exemplary embodiment, a display information management unit 112 displays an observation necessity degree as a temporal-spatial solid in a three-dimensional space as illustrated in FIG. 9A. The temporal-spatial solid is a parallelepiped, and two sides correspond to an x-axis and a y-axis that respectively extend along a length direction and a height direction of a plan view image. A t-axis vertical to these axes is a time axis, and a voxel defined by coordinates in these three axes is displayed in a color corresponding to an observation necessity degree corresponding to the location and time.

A slice cut along a plane vertical to the t-axis corresponds to a plan view image of an observation necessity degree at the time. An image in which a slice cut along a cursor 801 moving along the t-axis is superimposed on the plan view image is displayed on a window 802. If the user moves the cursor 801 using the operation unit 103, the user can see, on the window 802, a plan view image of an observation necessity degree that corresponds to the time of the cursor 801. In addition, a plan view image is superimposed also on a cross-section of the temporal-spatial solid that extends along the cursor 801.

In the temporal-spatial solid, the appearance of a person is expressed in such a manner that a portion with a high observation necessity degree spreads in a t-axis direction as indicated in a heat map 803. In the present exemplary embodiment, the user aims to find out a person from the temporal-spatial solid. In the present exemplary embodiment, the existence of a person having a designated attribute is used as an observation factor. If the person having the designated attribute exists, the observation factor management unit 114 sets an observation necessity degree to be increased.

By operating an observation factor window 804, the user adds an attribute condition of a person. In FIG. 9A, a person with short hair and wearing black clothes is designated in the observation factor window 804. Based on the designation, the observation factor management unit 114 designates "black clothes" and "short hair" as observation factors having high weights. Observation necessity degrees of a time and a location at which such a person exists in the temporal-spatial solid accordingly increase. The user checks, from a plan view image and a picture, points in the temporal-spatial solid that have high observation necessity degrees, and searches for a desired person matching the conditions.

If a condition of a desired person is newly added, points with high observation necessity degrees are narrowed down. If the user adds conditions by operating the observation factor window as illustrated in an observation factor window 805, the display changes as illustrated in FIG. 9B.

In addition, the user can directly reflect obtained information into the temporal-spatial solid. For example, if it is known that a construction work is performed in a certain time and range and a person cannot enter the range, for example, the user designates a range 806 of the temporal-spatial solid, and designates an observation necessity degree of the range 806 to decrease. In addition, for example, if it is known that a crime has been committed at a certain time and a criminal person is highly likely to exist nearby, the user designates the time as indicated by a slice 807, and sets an observation necessity degree to be higher at a time around the designated time. These pieces of information input by the user into the temporal-spatial solid are each managed by the observation factor management unit 114 as one observation factor.

Figure 10:
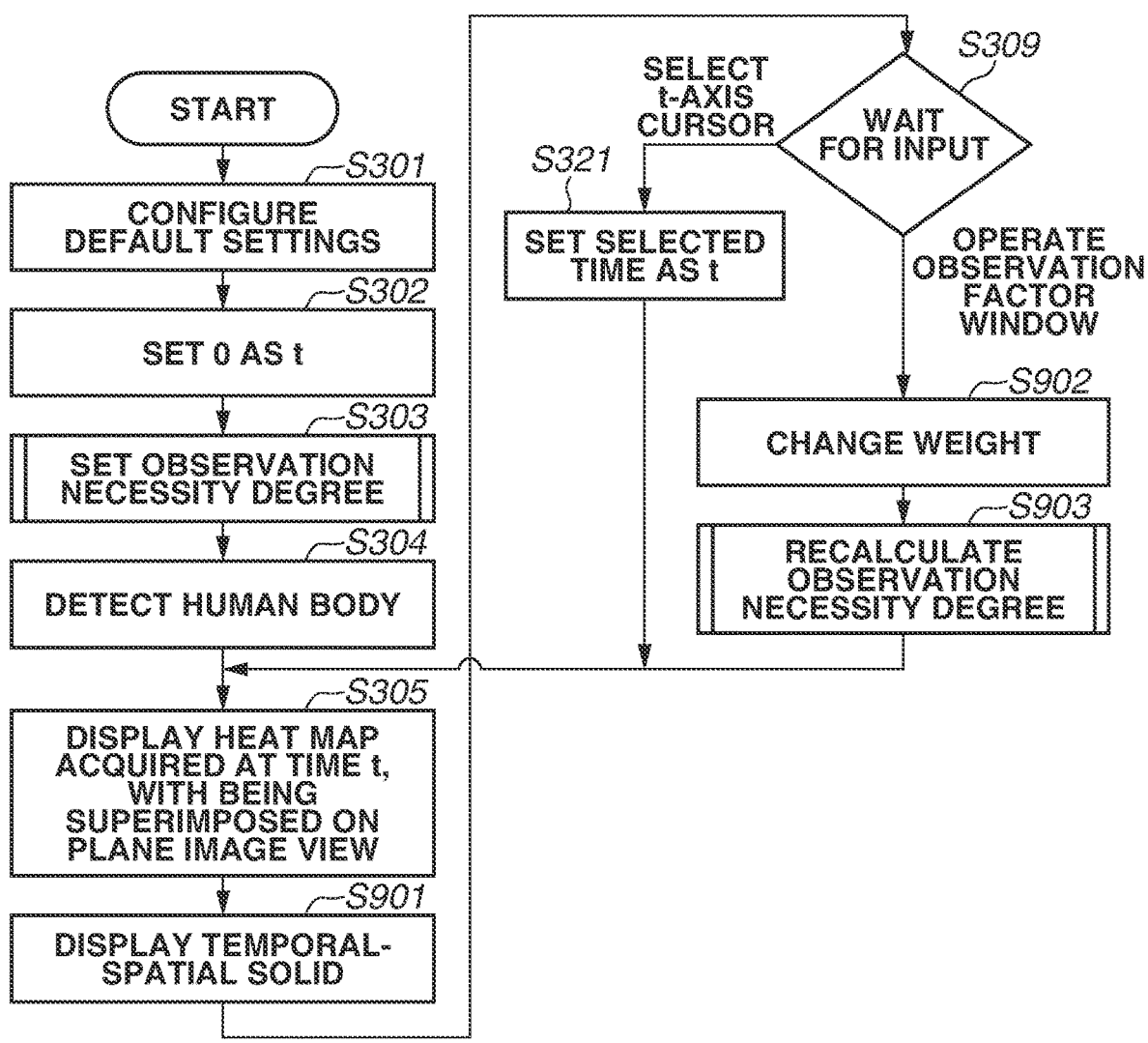
FIG. 10 is a flowchart illustrating an example of basic information processing according to the third exemplary embodiment.

Next, processing for implementing the above-described operation will be described using FIG. 10. A flowchart illustrated in FIG. 10 corresponds to the flowchart illustrated in FIG. 4 in the first exemplary embodiment. Differences from FIG. 4 will be described below.

In step S901, based on an observation necessity degree set by the observation necessity degree setting unit 115, the display information management unit 112 displays a temporal-spatial solid.

Figure 11A:
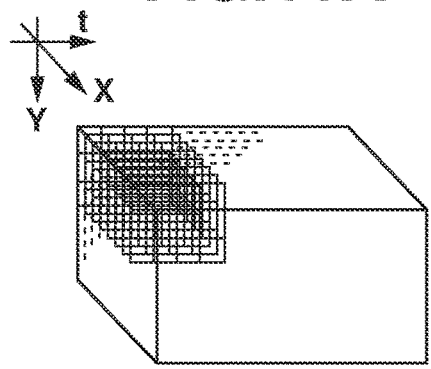
FIGS. 11A, 11B, 11C, and 11D are diagrams each illustrating an example of display of a temporal-spatial solid.

The temporal-spatial solid is a parallelepiped obtained by stacking rectangular plan view images spreading in an x-axis direction and a y-axis direction, in the t-axis direction vertical to the x-axis direction and the y-axis direction. More specifically, as illustrated in FIG. 11A, a cube formed by a pixel of a plan view image and the minimum unit in the time axis direction is regarded as a voxel, and each cube is colored. Observation necessity degrees are thereby displayed as a three-dimensional heat map.

The display information management unit 112 extracts a plane formed by voxels having the same value in the t-axis direction, to match a plan view image of a time corresponding to the position in the t-axis direction. The length in the t-axis direction of the temporal-spatial solid (the number of parallelepipeds) is determined depending on the size of the display screen of the display unit 102, and the time is determined to equally divide the length of a target picture. If the number of frames of the target picture is insufficient with respect to the length in the t-axis direction of the temporal-spatial solid, the display information management unit 112 complements a plane by linear interpolation from adjacent planes.

The display information management unit 112 transparently displays each voxel of the temporal-spatial solid, to enhance the visibility of the inside of a corresponding voxel. Each voxel has an alpha channel indicating opacity, and the display information management unit 112 sets the opacity in accordance with the magnitude of an observation necessity degree similarly to color tone. The display information management unit 112 makes a voxel more opaque as an observation necessity degree gets larger, and sets the largest opacity if an observation necessity degree is smaller than a predetermined value. This configuration helps the user to view a point with a high observation necessity degree even if the point is located on the rear side when the user faces the screen of the temporal-spatial solid.

Even with such a configuration, if points with high observation necessity degrees overlap, a rear point hides behind a front point with a high observation necessity degree. In this case, the following configuration is employed.

Figure 11B:
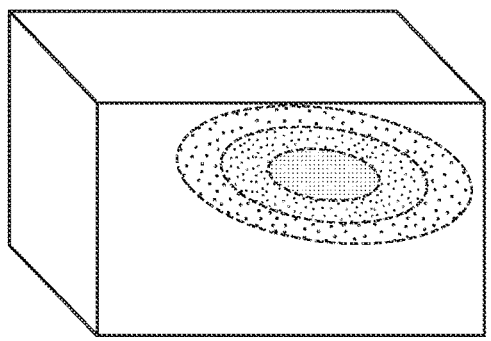
Figure 11C:
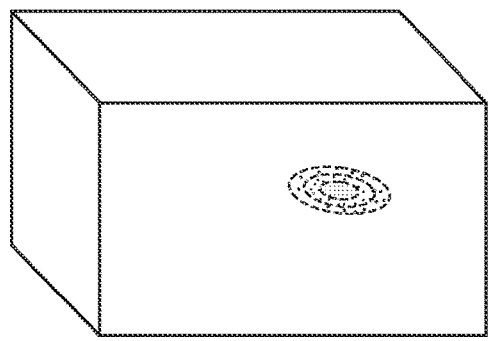

FIGS. 11B and 11C illustrate temporal-spatial solids each including a region with a high observation necessity degree. A region with a high observation necessity degree that is illustrated in FIG. 11B is located on the front side of a region with a high observation necessity degree that is illustrated in FIG. 11C. In addition, although FIGS. 11A-11D illustrate observation necessity degrees as a three-color concentric pattern, in reality, a color tone smoothly changes. In other words, the border of a concentric circle that is indicated by a dotted line is not actually displayed.

Figure 11D:
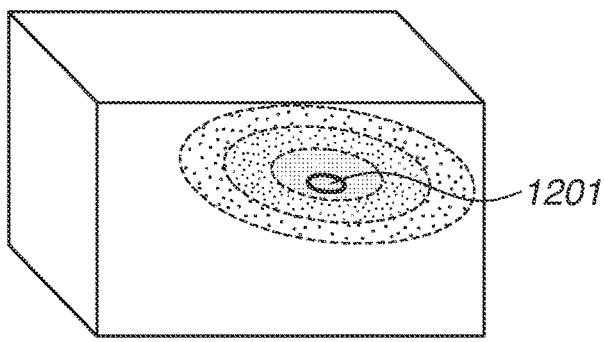

When the two regions with high observation necessity degrees respectively illustrated in FIGS. 11B and 11C are displayed at the same time, the region in FIG. 11C hides behind the region in FIG. 11B, and the region in FIG. 11C becomes invisible. In such a case, as illustrated in FIG. 11D, the display information management unit 112 displays a contour line 1201 indicating a certain height of an observation necessity degree of the rear region, at the foremost of the temporal-spatial solid. This makes visible the other point with a high observation necessity degree that is located on the rear side of the front region with a high observation necessity degree. In this manner, the display information management unit 112 sets the presence or absence of the display of a contour line based on a distribution of observation necessity degrees.

In step S309, if it is determined that the user has operated an observation factor window using the operation unit 103, the processing proceeds to step S902.

In step S902, the observation factor management unit 114 changes a weight of an observation factor in accordance with an operation performed on the observation factor window.

In step S903, the observation necessity degree setting unit 115 resets an observation necessity degree in accordance with the change in the weight of the observation factor.

In steps S303 and S903 in the present exemplary embodiment, an observation factor is calculated in the following manner.

The observation necessity degree setting unit 115 sets an observation factor of a clothes color based on a person picture detected by the information input target detection unit 113. The observation necessity degree setting unit 115 averages pixel values of a region corresponding to clothes, and calculates a reciprocal of a distance from a color designated by the observation factor management unit 114. For example, the observation necessity degree setting unit 115 calculates a reciprocal of a distance in a uniform color space such as an L*a*b* color space, and multiplies the reciprocal by 100. The observation necessity degree setting unit 115 sets the resultant value as a value of an observation factor at a position at which a corresponding person appears. In other words, the observation necessity degree setting unit 115 sets a larger value of an observation factor as coloring of clothes gets closer to the designated color.

The observation necessity degree setting unit 115 sets an observation factor of a hairstyle based on a person picture detected by the information input target detection unit 113. The observation necessity degree setting unit 115 performs pattern matching of a head region, and sets a degree of match with a model with a hairstyle designated by the observation factor management unit 114, as a value of an observation factor at a position at which a corresponding person appears. Hairstyle models that can be designated by the observation factor management unit 114 are prepared in advance.

The observation necessity degree setting unit 115 sets an observation factor of a height based on a person picture detected by the information input target detection unit 113. The observation necessity degree setting unit 115 normalizes an image captured at a time point at which posture is closest to upright posture, using a distance from a camera, and obtains a distance between a head top point and a foot point. Then, the observation necessity degree setting unit 115 compares the obtained distance with a range designated by the observation factor management unit 114 such as 160 cm or more, for example. As a value of an observation factor at a position at which a corresponding person appears, the observation necessity degree setting unit 115 sets 100 if the distance is included in the range, and sets 0 if not.

The observation necessity degree setting unit 115 sets an observation factor of gender based on a person picture detected by the information input target detection unit 113. The observation necessity degree setting unit 115 performs pattern matching, and sets a degree of match with a model with a gender designated by the observation factor management unit 114, as a value of an observation factor at a position at which a corresponding person appears.

The observation necessity degree setting unit 115 sets an observation factor of appearance based on a person picture detected by the information input target detection unit 113. The observation necessity degree setting unit 115 recognizes emotion of a person using an emotion recognition method, sets a value based on an amount of components of emotion designated by the observation factor management unit 114, and sets the resultant value as a value of an observation factor at a position at which a corresponding person appears.

The observation necessity degree setting unit 115 sets an observation factor of belongings based on a person picture detected by the information input target detection unit 113. The observation necessity degree setting unit 115 detects a moving object that is located around a person and moves in accordance with the person, and sets a value depending on whether the moving object falls within a category of an object designated by the observation factor management unit 114. As a value of an observation factor at a position at which a corresponding person appears, the observation necessity degree setting unit 115 sets 100 if the moving object falls within the category, and sets 0 if not.

According to the information processing apparatus 100 of the present exemplary embodiment, the user can find out a person using a temporal-spatial solid.

In a fourth exemplary embodiment, as a method of using an observation necessity degree that is different from the method in the first and second exemplary embodiments, a method of using an observation necessity degree for market analysis will be described.

An operation on a display unit and an operation of the user in the present exemplary embodiment will be described using FIG. 12.

In the present exemplary embodiment, similarly to the first exemplary embodiment, the information processing apparatus 100 calculates and displays an observation necessity degree, and the user adds information while regarding a person as an information input target. As a display method of an observation necessity degree, similarly to the third exemplary embodiment, the display information management unit 112 displays an observation necessity degree using a temporal-spatial solid 1000.

Observation factors that is managed by the observation factor management unit 114 in the present exemplary embodiment include age group and gender, a staying degree, a purchase price, an approach mode, and a recommended product.

The user operates an observation factor window 1001 in the present exemplary embodiment using the operation unit 103, and determines a weight of an observation factor desired to be researched. In addition, as attribute information and input information, the user designates targeted items using a drop-down list 1002 and a text box 1003.

Figure 12:
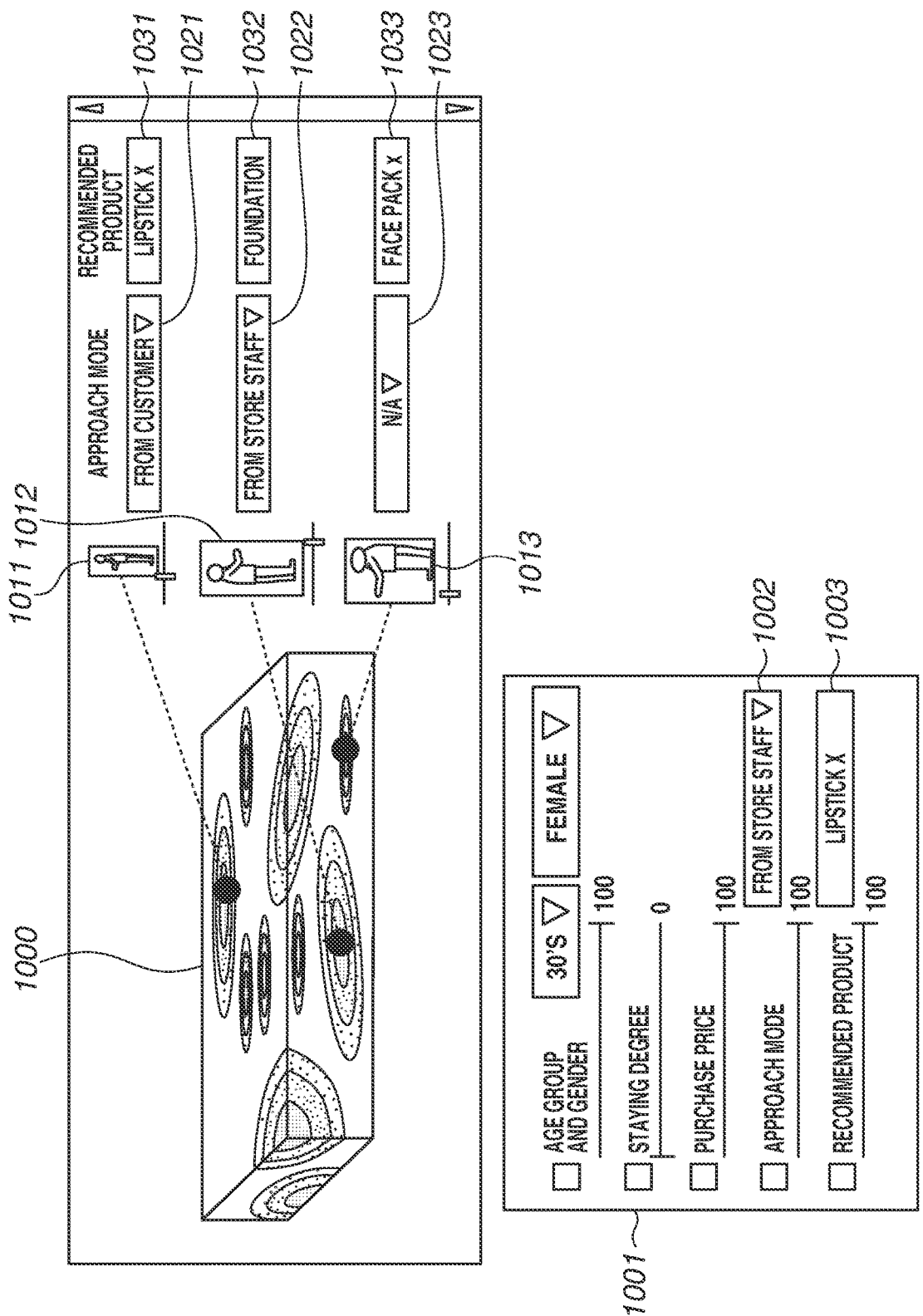
FIG. 12 is a schematic diagram illustrating a user interface screen according to a fourth exemplary embodiment.

In the example illustrated in FIG. 12, the user desires to survey a relationship between a purchase price and an attendance of a store staff regarding women in thirties. First of all, by operating the observation factor window 1001, the user sets "30's" and "female" as age group and gender, and sets 100 as weights of observation factors of the age group and gender and the purchase price. As a result, in the plan view image 201, a point at which a person who is a woman in thirties, has a high purchase price, and has been detected by the information input target detection unit 113 exists is displayed in the temporal-spatial solid as a point with a dark color and with a high observation necessity degree.

The user desires to survey sale obtained when a store staff approaches and recommends a lipstick X. By operating the observation factor window 1001, the user sets "from a store staff" as an approach mode and the "lipstick X" as a recommended product. Because the information processing apparatus 100 cannot automatically determine observation factors of the approach mode and the recommended product, the user needs to input the observation factors as label information. Person pictures 1011, 1012, and 1013 sorted in descending order of observation necessity degree are displayed. In addition, drop-down lists 1021, 1022, and 1023 for selecting an approach mode and text boxes 1031, 1032, and 1033 for inputting a recommended product are displayed, to respectively correspond to the person pictures 1011, 1012, and 1013. The user inputs these pieces of information with taking care with a person with a high observation necessity degree.

If the input progresses, the temporal-spatial solid 1000 changes, and points with high observation necessity degrees are narrowed down to a person who has been approached by the store staff and has received a recommendation of the lipstick X. By studying the temporal-spatial solid, the user can recognize a relationship between sale, a position of a selling space, and a time slot under a designated condition. In addition, when the user changes a condition by operating the observation factor window 1001, the user can observe what changes occur.

Figure 13:
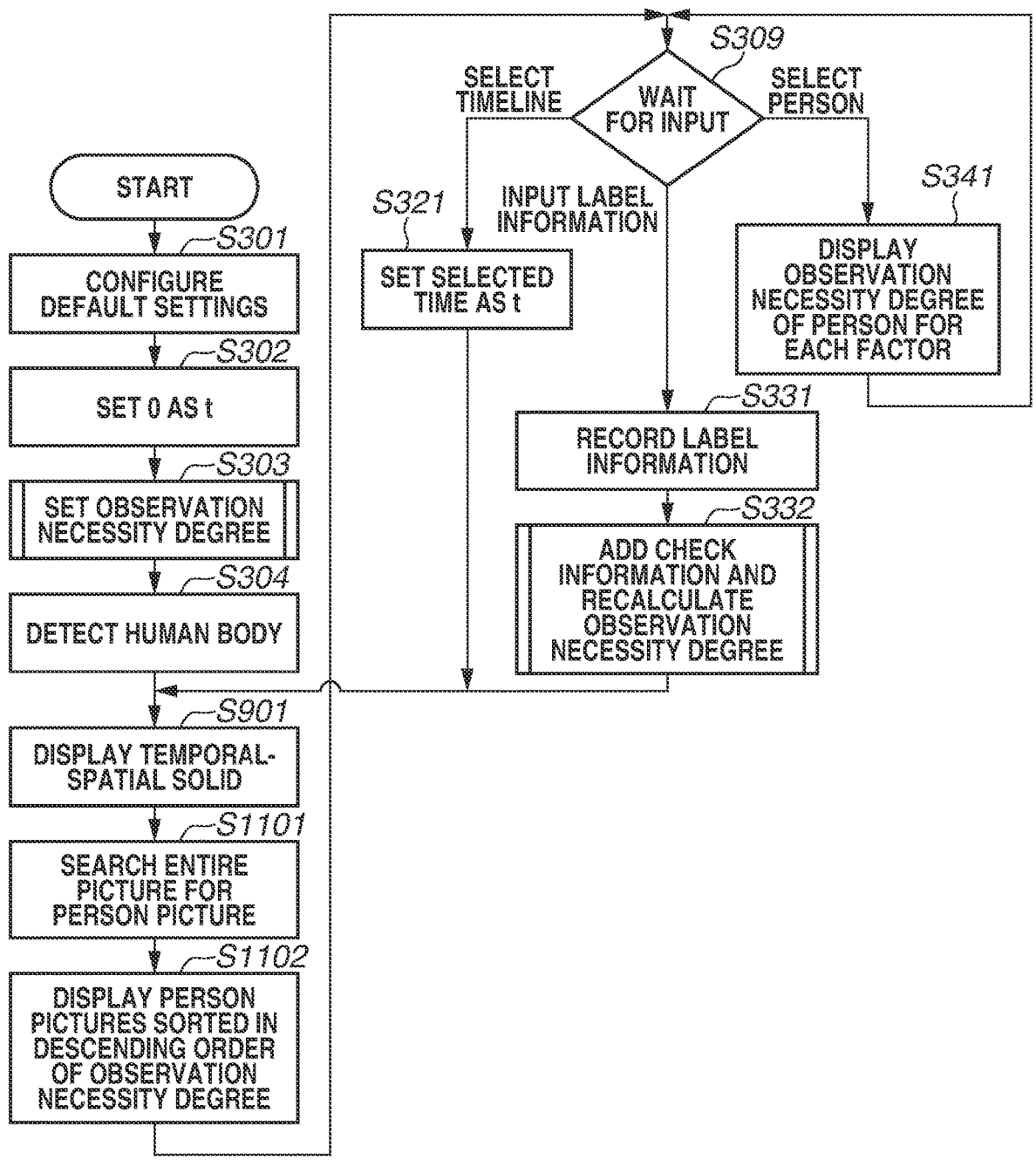
FIG. 13 is a flowchart illustrating an example of basic information processing according to the fourth exemplary embodiment.

Next, processing for implementing the above-described operation will be described using FIG. 13. A flowchart illustrated in FIG. 13 corresponds to the flowchart illustrated in FIG. 4 in the first exemplary embodiment. Differences from FIG. 4 will be described below.

In place of steps S305 and S306, the display information management unit 112 performs the processing similar to the processing in step S901 in the third exemplary embodiment, for displaying a temporal-spatial solid.

In step S1101, the display information management unit 112 acquires all persons detected by the information input target detection unit 113. In the present exemplary embodiment, for labeling a person picture using a temporal-spatial solid, the display information management unit 112 acquires persons not only from a time slice but also from the entire target picture.

In step S1102, the display information management unit 112 displays all the persons appearing in the target picture that have been obtained in step S1101, in a manner sorted by observation necessity degree. As an observation necessity degree of a person, a term $a_h$ obtained by the following formula is used:

$$a_h = \sum_{e \in L} a_h(e),$$

where a term $a_h(e)$ represents a representative value of an observation factor e of the person h described in the second exemplary embodiment. A term L represents a set of all observation factors.

In steps S303 and S332 in the present exemplary embodiment, an observation factor is calculated in the following manner. The observation necessity degree setting unit 115 sets an observation factor of age group and gender based on a person picture detected by the information input target detection unit 113. The observation necessity degree setting unit 115 designates age and gender of a person using an estimation method of age group and gender. As a value of an observation factor at a position at which a corresponding person appears, the observation necessity degree setting unit 115 sets 100 if a person corresponds to the age and the gender that have been designated by the observation factor management unit 114, and sets 0 if not.

The observation necessity degree setting unit 115 sets an observation factor of a staying degree in accordance with speeds at a target position of persons detected by the information input target detection unit 113. For example, the observation necessity degree setting unit 115 collects persons who have passed through the inside of a circle centered on the target position, within the last five minutes, calculates a time average of speeds within the circle, multiplies a reciprocal of the time average by 100, and sets the resultant value as a value of an observation factor. The observation necessity degree setting unit 115 sets a larger value of an observation factor as a speed of a person who has passed through the neighborhood at the last minute gets smaller.

The observation necessity degree setting unit 115 sets an observation factor of a purchase price using a person picture detected by the information input target detection unit 113, and an external POS in combination. Based on a time at which a person heads for a region of an electronic cash register, the observation necessity degree setting unit 115 acquires, from the POS, a record of purchase performed at the time, and sets a value obtained by dividing an amount of payment by a predetermined upper limit amount such as 50 thousand yen and multiplying the resultant value by 100, as a value of an observation factor at a position at which the corresponding person appears.

The observation necessity degree setting unit 115 sets observation factors of an approach mode and a recommended product based on label information input by the user using the operation unit 103. The observation necessity degree setting unit 115 sets 100 as a value of an observation factor of an approach mode for a person to whom label information matching an approach mode designated by the observation factor management unit 114 has been added. In addition, the observation necessity degree setting unit 115 sets 100 as a value of an observation factor of a recommended product for a person to whom label information including, as a partial character string, a character string of a recommended product designated by the observation factor management unit 114 has been added.

According to the information processing apparatus 100 of the present exemplary embodiment, the user can use information regarding an observation necessity degree for market analysis.

Examples of exemplary embodiments have been described in detail above. Nevertheless, the present invention is not limited to these specific exemplary embodiments. For example, the aforementioned exemplary embodiments may be arbitrarily combined and implemented.

As described above, according to the processing in each of the aforementioned exemplary embodiments, the user can obtain feedback by the addition of information, and can accurately and efficiently add information to pictures and perform analysis using the added information.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-154108, filed Aug. 20, 2018, which is hereby incorporated by reference herein in its entirety.

What is claimed is:

1. An information processing apparatus comprising:
one or more memories storing instructions; and
one or more processors which, when executing the instructions, causes the apparatus to:
set a plurality of observation necessity degrees each of which is representing a place to be observed by a user, for a plurality of positions corresponding to a real space;
display a map representing the plurality of observation necessity degrees for the plurality of the positions corresponding to the real space and a target detected from a captured image; and
receive, from the user, an input information corresponding to the target detected from the captured image,
wherein the input information contains a label representing a state of the target, and
wherein an appearance area of the target on the map is updated based on the input information so as to change at least one of the plurality of observation necessity degree.

2. The information processing apparatus according to claim 1, wherein the plurality of observation necessity degrees is determined based on a plurality of observation factors and weights for the observation factors.

3. The information processing apparatus according to claim 2, wherein the plurality of observation factors is updated based on the input information.

4. The information processing apparatus according to claim 2, wherein the plurality of observation factors is displayed for setting of at least one observation necessity degree of the plurality of observation necessity degrees.

5. The information processing apparatus according to claim 4, wherein the plurality of observation factors is displayed for setting of an observation necessity degree associated with the target.

6. The information processing apparatus according to claim 2, wherein the weights for each of the observation factors are set based on an importance degree for each of the observation factors.

7. The information processing apparatus according to claim 6, wherein the importance degree for the each of the observation factors is set based on an operation of the user.

8. The information processing apparatus according to claim 6, wherein the importance degree for at least one observation factor is set based on a history of the input information.

9. The information processing apparatus according to claim 8, wherein the importance degree for the each of the observation factors is estimated based on the history of a user operation.

10. The information processing apparatus according to claim 2, wherein
the observation factor includes at least one of a first appearing person, camera view occupancy, a flow of people, guard patrol, a Point of Sale (POS) record, and an input operation.

11. The information processing apparatus according to claim 1, wherein the map is a three-dimensional map based on the plurality of positions corresponding to the real space.

12. The information processing apparatus according to claim 11, wherein the map is designated by the user, at positions in the three-dimensional space that correspond to the plurality of positions corresponding to the real space.

13. The information processing apparatus according to claim 11, wherein the map has a contour line of an observation necessity degree in the three-dimensional space.

14. The information processing apparatus according to claim 13, wherein the contour line of the observation necessity degree is determined based on a distribution of observation necessity degrees.

15. The information processing apparatus according to claim 1, wherein the one or more processors causes the apparatus to detect the plurality of targets from the captured image.

16. The information processing apparatus according to claim 1, wherein the observation necessity degree and the map are updated based on the input information so as to reduce an observation necessity degree for a position near a target who has already been observed.

17. The information processing apparatus according to claim 1, wherein the appearance area of the target on the map is updated based on the input information so as to increase the observation necessity degree for the appearance area if a target to whom a label representing a necessity for an observation is added has appeared.

18. The information processing apparatus according to claim 1, wherein the detected target is displayed in a manner sorted from the top in descending order of the observation necessity degree.

19. An information processing method comprising:

setting a plurality of observation necessity degrees each of which is representing a place to be observed by a user, for a plurality of positions corresponding to a real space;

displaying a map representing the plurality of observation necessity degrees for the plurality of the positions corresponding to the real space and a target detected from a captured image; and receiving, from a user, an input information corresponding to the target detected from the captured image, wherein the input information contains a label representing a state of the target, and wherein an appearance area of the target on the map is updated based on the input information so as to change at least one of the plurality of observation necessity degree.

20. A non-transitory computer-readable storage medium storing a program for causing a computer to execute:

setting a plurality of observation necessity degrees each of which is representing a place to be observed by a user, for a plurality of positions corresponding to a real space;

displaying a map representing the plurality of observation necessity degrees for the plurality of the positions corresponding to the real space and a target detected from a captured image; and receiving, from a user, an input information corresponding to the target detected from the captured image, wherein the input information contains a label representing a state of the target, and wherein an appearance area of the target on the map is updated based on the input information so as to change at least one of the plurality of observation necessity degree.

* * * * *